United States Patent

[11] 3,612,877

[72] Inventor Eric C. Hopkinson
Houston, Tex.
[21] Appl. No. 699,853
[22] Filed Jan. 23, 1968
[45] Patented Oct. 12, 1971
[73] Assignee Dresser Industries, Inc.
Dallas, Tex.

[54] VISUAL DISPLAY OF THE DECLINE OF THE THERMAL NEUTRON POPULATION IN A WELL BOREHOLE
7 Claims, 4 Drawing Figs.
[52] U.S. Cl. ............................................. 250/83.3, 250/83.1, 250/83.6
[51] Int. Cl. .............................................. G01v 5/00
[50] Field of Search ........................................... 250/83.1, 83.3, 83.6 W Primary Examiner—Archie R. Borchelt
Attorneys—Robert W. Mayer, Daniel Rubin, Peter J. Murphy, Douglas M. Clarkson, Roy L. Van Winkle and William E. Johnson, Jr.

ABSTRACT: A well logging instrument having a pulsed neutron source and a radiation detector is adapted for travel through an earth borehole. The signal pulses from the detector are sent to the surface electronics, along with the neutron source synchronization pulses. In the surface electronics, the signal pulses are separated from the synchronization pulses. The synchronization pulses then drive a sawtooth generator, the duration of the ramp function being equal to the separation between the synchronization pulses. The signal pulses are coupled through a variable gain amplifier to a multichannel pulse height analyzer, the gain of the amplifier being a function of the slope of the ramp function. The multichannel pulse height analyzer drives an oscilloscope, thus providing a visual display of the declining curve representative of the signal pulses from the borehole instrument.

ERIC C. HOPKINSON
INVENTOR.

BY William E. Johnson Jr.
ATTORNEY.

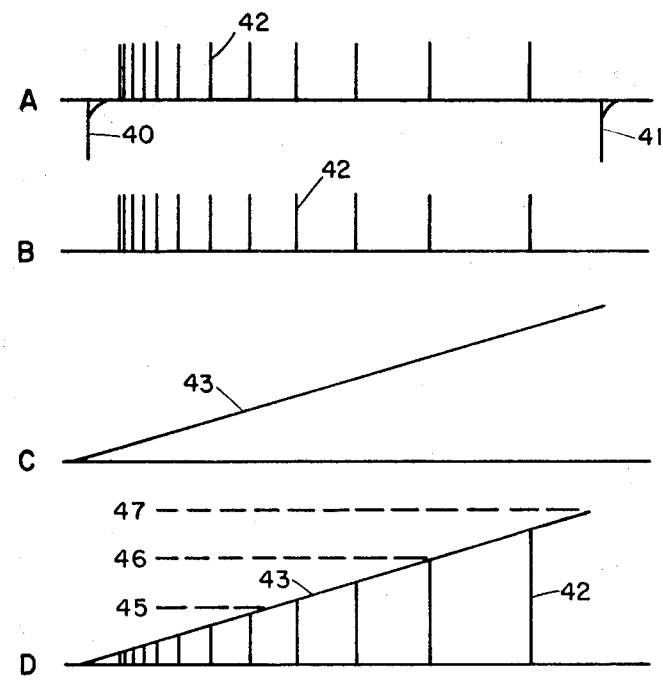
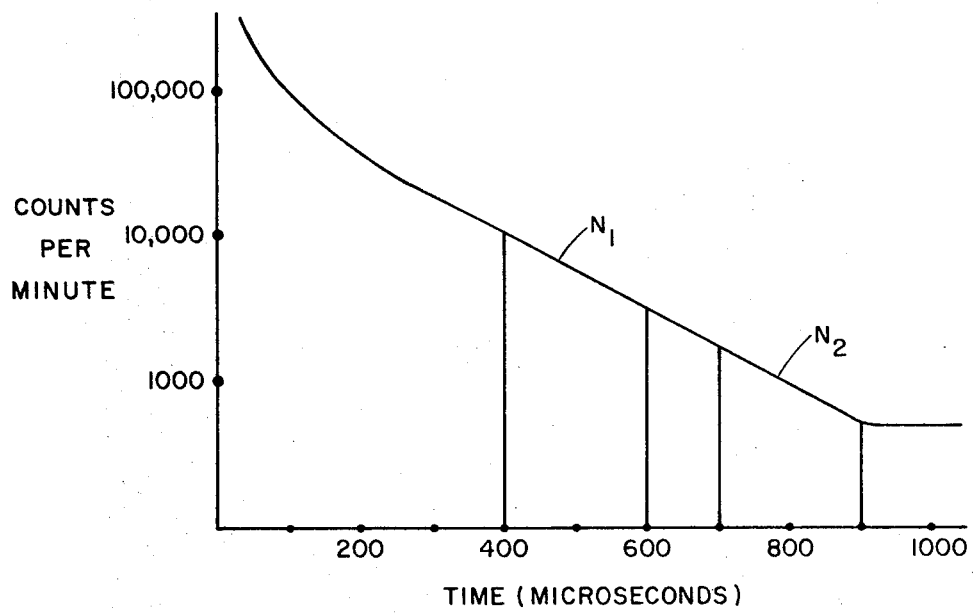

VISUAL DISPLAY OF THE DECLINE OF THE THERMAL NEUTRON POPULATION IN A WELL BOREHOLE

BACKGROUND OF THE INVENTION

This invention relates to the art of geophysical prospecting in general and to the art of radioactivity well logging in particular and more particularly to improvements in such logging wherein the lifetime of neutrons in the formation is measured.

In the copending application of Arthur H. Youmans, Serial No. 623,778, now U.S. Pat. No. 3,379,882 assigned to the assignee of the present invention, there is described a system for radioactivity well logging wherein the formations are irradiated with neutrons from a periodically varying source operating at a repetition rate of the order of magnitude of hundreds or thousands cycles per second, being thus alternately on and off for periods of hundreds of microseconds. A detecting system is synchronized with the source to operate while the source is off. The radiation detected may be either slow neutrons or gamma rays which result from thermal neutron capture; in either case the resultant signal is related to the population of thermal neutrons in formation surrounding the borehole. From the time the source is turned off, the slow neutrons are gradually captured and the amount of radiation detected per unit time decreases until the source is again turned on. By measuring the number of thermal neutrons (or gamma rays produced by the thermal neutrons) present at any particular time, the rate of decay of the thermal neutron population may be measured.

The present invention relates to an improvement upon the system as described in said copending application and as such comprises, broadly, means for providing a visual indication of the decline of the thermal neutron population occuring between the neutron source pulses by providing circuitry which converts radiation detector pulses into a form suitable for handling by a multichannel pulse height analyzer.

Therefore, the principal object of the invention is to provide an improved system for determining geophysical characteristics of formations about a borehole;

It is another object of the invention to provide a system which converts pulses of substantially identical amplitude into pulses of varying amplitude;

It is a further object of the invention to provide an improved system for neutron well logging based on the decline of the thermal neutron population in the formations surrounding a borehole, and It is yet another object of the invention to provide a system for neutron well logging having a visual monitor of the decline of the thermal neutron population.

Other objects, features and advantages of the invention will become apparent from the following detailed description, when considered with the accompanying drawings, in which:

FIG. 3 is a schematic representation of electrical waveforms at designated points within the circuitry in FIG. 2; and FIG. 4 is a schematic representation of the characteristic decay of the thermal neutron population following a burst of fast neutrons within a well.

Figure 1:
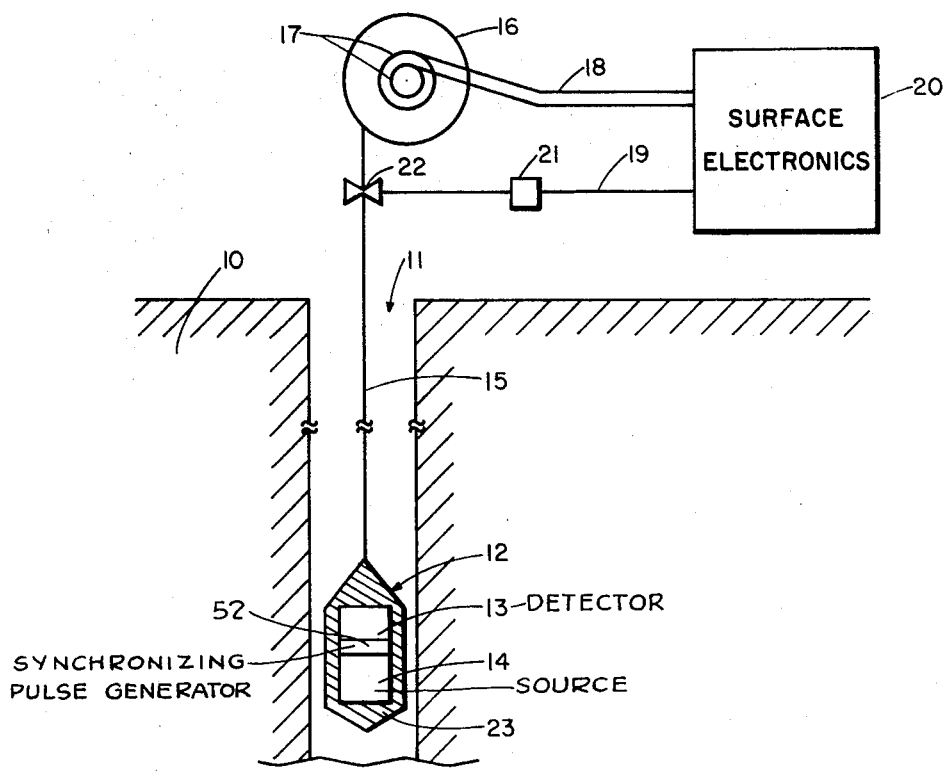
FIG. 1 is a side elevational view partly in section illustrating a system according to the invention, and the disposition of parts of the system relative to the strata to be examined.

Referring now to the drawings in detail, particularly to FIG. 1, there is illustrated schematically a radioactive well surveying operation in which a portion of the earth's surface 10 is shown in vertical section. A well 11 penetrates the earth's surface and may or may not be cased. Disposed within the well is subsurface instrument 12 of the well logging system. Subsurface instrument 12 comprises a detecting system 13, a synchronizing pulse generator 52 and a pulsed neutron source 14. Cable 15 suspends the instrument in the well and contains the required conductors for electrically connecting the instrument with the surface electronics 20 and related equipment. The cable is wound on, or unwound from, drum 16 in raising and lowering the instrument 12 to traverse the well.

In making a radioactivity log of a well, instrument 12 is caused to traverse the well. Thereby neutrons from source 14 irradiate the formations surrounding the borehole, and radiations influenced by the formations are detected by detecting system 13. The resultant signals are sent to the surface through cable 15. Through slip rings and brushes 17 on the end of the drum 16, the signals are conducted by lines 18 to the surface electronics section 20, to be described in more detail hereinafter. A recorder (illustrated generally in FIG. 2 within the block 35) is driven through a transmission 21 and line 19 by measuring reel 22 over which cable 15 is drawn so that the recorder moves in correlation with depth as the instrument 12 traverses the well. The elements are shown diagrammatically and it is to be understood that the associated circuits and power supplies are provided in a conventional manner. It is also to be understood that the instrument housing 23 is constructed to withstand the pressures and mechanical and thermal abuses encountered in logging a deep well and provides adequate space within it to house the necessary apparatus and to permit the transmission of radiation through it.

As is well known in the art of radioactivity well logging, the formation 10 is irradiated by neutrons exiting from the pulsed neutron source 14, for example, a D-T accelerator. These neutrons participate in elastic and inelastic collisions with the atoms contained in the various layers of the formation. The secondary radiation resulting from bombardment by the primary radiation in the form of neutrons from the source 14 is detected by the radiation detector 13, the detector 13 then sending electrical signal pulses up the cable 15. The synchronizing pulse generator sends an electrical signal pulse up the cable 15 coincident with the pulse of neutrons from source 14.

The measurement of the decline of the thermal neutron population provides a means for determining a property of the material surrounding the borehole which is a definite, calculable, physical parameter, the macroscopic capture cross section of the formation.

Figure 2:
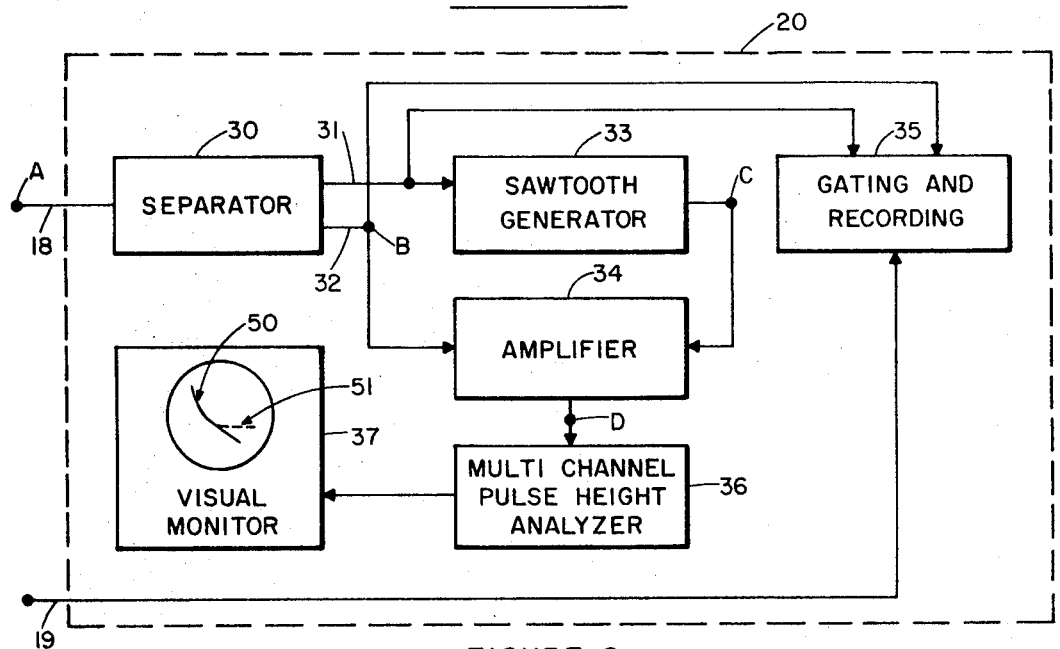
FIG. 2 is a block diagram of the surface electronics in the system according to the invention.

FIG. 2 illustrates in block diagram the circuitry embodied within the block 20 of FIG. 1. The signals from the conductor 18 are in the form of pulses as generally illustrated at point A in FIG. 3. The combined signal pulses and synchronizing pulses are coupled into a conventional signal separator circuit 30, whereby the synchronizing pulses are coupled into a sawtooth generator 33 through conductor 31 and the signal pulses are coupled into the amplifier 34 through the conductor 32.

The signal separator circuit can be, for example, the circuit described in U.S. Pat. 3,371,312, corresponding to Ser. No. 414,518, filed Nov. 23, 1964, and assigned to the assignee of the present invention.

Conductors 31 and 32 are also connected into the gating and recording circuitry 35 whereby the detected signals can be gated and the rate of the decline of the thermal neutron population computed and recorded, all as disclosed in said copending application, now Ser. No. 623,778, now U.S. Pat. No. 3,379,882. It should be appreciated, however, that in the copending application, the gating is done within the borehole instrument in the preferred embodiment.

Amplifier 34, having a variable gain functionally related to the slope of the output of the sawtooth generator 33, amplifies the signal pulses from the signal separator circuit and couples them into the multichannel pulse height analyzer 36. The variable gain amplifier 34 can be any of the conventional types wherein the amplification factor changes with the bias applied, and may, for example, use a variable-$\mu$ electron tube such as is described on page 247 of *Fundamentals of Industrial Electronic Circuits*, 1947, the McGraw-Hill Book Co., wherein the amplification factor of the tube is seen to change as the bias on the grid is changed.

The multichannel pulse height analyzer 36 is designed to measure the number of pulses falling within each of the predetermined amplitude ranges, and may be any of the conventional such analyzers well known to those in the art.

The output of the multichannel pulse height analyzer 36 is coupled into the monitoring means 37, which may be, for example, an oscilloscope. It should be appreciated that other visual monitor systems could be used instead of an oscilloscope, for example, a solid state display device.

FIG. 3 illustrates some of the characteristic waveforms found within the circuitry of FIG. 2. Point A, as found on the conductor 18, includes the pulse source synchronization pulses 40 and 41. In the preferred embodiment of the pulsed neutron well logging system according to the present invention, pulses 40 and 41 are 1,000 microseconds apart. Point A also includes the signal pulses 42 which, being indicative of the decline of the thermal neutron population in the formations surrounding a borehole following a fast neutron burst, occur less frequently as a function of time following the neutron source pulses. Point B illustrates the signal pulses after having been separated from the synchronization pulses in the separation circuitry 30.

Point C illustrates the output of the sawtooth generator 33, the duration of the ramp function being substantially equal to the time between the synchronization pulses 40 and 41. Thus, in the preferred embodiment, if the time between pulses 40 and 41 is 1,000 microseconds, then the ramp function curve 43 will continue to rise (or decline, if desired) for approximately 1,000 microseconds. However, if desired, the ramp function could be truncated so that the curve 43 could rise for some time less than the time between the synchronization pulses.

Point D illustrates the effect of having the gain of the amplifier 34 change as a function of the sawtooth output. Since the multichannel pulse height analyzer 36 measures the number of pulses occurring within several amplitude ranges, it is seem from point D in FIG. 3, by way of example, that eight pulses fall under the point 45, three pulses come between points 45 and 46, and that one pulse comes between points 46 and 47. The output of the analyzer 36 is then coupled into the visual monitor 37 to produce a declining curve 50 (illustrated in FIG. 2). The dotted curve 51 shown on the monitor indicates to the observer that some malfunction is occurring, such as preignition of the pulsed neutron source.

Thus, the curve 50 illustrated in FIG. 2 provides a visual indication somewhat like the plot of the decline of the thermal neutron population illustrated in FIG. 4. In the copending application Ser. No. 623,778, now U.S. Pat. No. 3,379,882, the $N_1$ and $N_2$ gates provide an indication of the decline of the curve, and as mentioned herein above, this indication can be obtained from the equipment 35 illustrated in FIG. 2. It should be appreciated by those skilled in the art that the curve 50 can be observed on any scale desired, for example, either on a linear or upon a logarithmic vertical scale.

It should thus be appreciated that there has been described herein a radioactivity well logging system providing a visual indication of the decline of the thermal neutron population in the formations surrounding an earth borehole, following a burst of fast neutrons. However, modifications of this invention other than those herein suggested will become apparent to those of ordinary skill in the art after reading this disclosure. Therefore, it is intended that the matter contained in the foregoing description and the accompanying drawings be interpreted in an illustrative sense, and not in a limiting sense, when consideration is given to the appended claims.

The embodiments of the invention in which an exclusive property or privilege is claimed are defined as follows:

1. An electrical circuit for converting a series of pulses of substantially equal amplitude into a series of pulses of varying amplitude comprising:
   a. means for providing a ramp function of predetermined duration;
   b. a variable gain amplifier connected to said ramp means whose gain is functionally related to said ramp function; and
   c. input means for coupling said pulses of substantially equal amplitude into said amplifier, whereby the output pulses from said amplifier have varying amplitude one from another.

2. A method for determining the varying frequency of a series of pulses of substantially equal amplitude comprising:
   a. feeding said pulses into an amplifier:
   b. varying the gain of said amplifier only as a function of a preselected time interval; and
   c. counting the number of amplified pulses within a plurality of different amplitude ranges.

3. The method according to claim 2 including the additional step of providing a visual indication of said counting step.

4. A system for monitoring the decline of the thermal neutron population in the formation surrounding an earth borehole comprising:
   a. a borehole instrument adapted for travel through an earth borehole,
   b. a pulsed neutron source in said instrument providing fast neutrons and synchronizing pulses functionally related to the pulsing of said source;
   c. a radiation detector in said instrument for producing electrical signal pulses indicative of the decline of the thermal neutron population in the formation surrounding the borehole following a burst of fast neutrons from said source;
   d. means for transmitting said signal pulses and said synchronizing pulses to the earth's surface;
   e. a ramp function generator driven by said synchronizing pulses, the duration of said ramp being functionally related to the time between each pair of said synchronization pulses;
   f. a variable gain amplifier for amplifying said signal pulses whose gain is dependent upon the amplitude of said ramp function;
   g. a multichannel pulse height analyzer connected to the output of said amplifier for counting the number of pulses within a plurality of different amplitude ranges; and
   h. a visual monitor connected to the output of said analyzer.

5. The system according to claim 4 wherein said signal pulses and said synchronizing pulses are transmitted up the same conductor cable.

6. The system according to claim 5 including in addition thereto means for separating said synchronizing pulses from said signal pulses at the earth's surface.

7. The system according to claim 4 wherein the duration of said ramp function is substantially equal to the time between each pair of synchronization pulses.